United States Patent
Damen et al.

(10) Patent No.: US 6,172,460 B1
(45) Date of Patent: Jan. 9, 2001

(54) DISPLAY DEVICE

(75) Inventors: Johannes P. M. Damen; Ronald Van Rijswijk; Cornelus H. M. Van Bommel, all of Eindhoven (NL)

(73) Assignee: U.S. Philips Corporation, New York, NY (US)

(*) Notice: Under 35 U.S.C. 154(b), the term of this patent shall be extended for 0 days.

(21) Appl. No.: 09/326,510

(22) Filed: Jun. 4, 1999

(30) Foreign Application Priority Data

Jun. 5, 1998 (EP) .................................................... 98201878

(51) Int. Cl.⁷ .................................................... H01J 17/24
(52) U.S. Cl. .................. 313/553; 313/560; 313/561; 313/481; 445/55; 445/41; 445/42
(58) Field of Search ................... 313/553, 549, 313/560, 561, 562, 481, 581, 582; 445/29, 31, 53, 55, 41, 42, 57

(56) References Cited

U.S. PATENT DOCUMENTS

| | | | |
|---|---|---|---|
| 5,525,861 | * 6/1996 | Banno et al. | 313/553 X |
| 5,525,862 | * 6/1996 | Miyazaki et al. | 313/582 |
| 5,917,283 | * 6/1999 | Roberson et al. | 313/582 |
| 6,057,643 | * 5/2000 | Kurai | 313/582 |

FOREIGN PATENT DOCUMENTS

0833363A2   4/1998 (EP) ................. H01J/17/49

* cited by examiner

Primary Examiner—Ashok Patel

(57) ABSTRACT

Display device, in particular a PALC device, having a plasma space provided with a capsule (46) comprising getter material for supplying guest material to the plasma, e.g. $H_2$, HD, $D_2$. The capsule remains closed until the critical high temperature processing has been finished.

9 Claims, 4 Drawing Sheets

DISPLAY DEVICE

BACKGROUND OF THE INVENTION

The invention relates to a display device comprising at least one compartment which contains an ionizable gas mixture, at least one composite gas of which is a gas of the group constituted by at least hydrogen, said compartment being provided with electrodes for selectively ionizing the ionizable gas during operation, and a getter material in connection with the ionizable gas.

The invention also relates to a method of manufacturing such a display device.

Display devices for displaying monochromatic or color images are, inter alia, plasma-addressed liquid crystal display devices, referred to as PALC displays, preferably of the flat-panel type. PALC displays are used as television and computer displays.

A display device of the type described in the opening paragraph is known from EP-A 0 833 363. The display device of the flat-panel type described in this patent application has a display screen with a pattern of (identical) data storage or display elements and a multitude of compartments. The compartments are filled with an ionizable gas and are provided with electrodes for (selectively) ionizing the ionizable gas during operation. In the known display device, the compartments have the shape of parallel, elongated channels (shaped as a channel plate) which function as selection means for the display device (the plasma-addressed row electrodes). By applying a voltage difference across the electrodes in one of the channels of the channel plate, electrons are emitted (from the cathode), which electrons ionize the ionizable gas while forming a plasma (plasma discharge). When the voltage across the electrodes in one channel is switched off and the gas is deionized, a subsequent channel is switched on. At the display screen side of the display device, the compartments are closed by a (thin) dielectric layer ("microsheet") provided with a layer of an electro-optical material, and further electrodes which function as data electrodes or column electrodes of the display device. The further electrodes are provided on a substrate. The display device is constituted by the assembly of the channel plate with the electrodes and the ionizable gas, the dielectric layer, the layer of the electro-optical material and the further electrodes.

To increase the lifetime of such display devices, decrease the ignition voltage of the plasma and obtain a more rapid extinction of the plasma, several percents of hydrogen are added to an ionizable (basic) gas such as helium in the known display device. The hydrogen gas is supplied in a getter which consists of a ZrVFe alloy in the known display device and is secured by means of a resilient construction in an exhaust box of the compartment.

In practice, the getter is first secured in the exhaust box, whereafter the exhaust box is fritted to the channel plate at approximately 450° C. The frit comprises an organic binder. The getter material is then contaminated with vapor of this binder so that the necessary exhaust time will be longer. To prevent hydrogen from escaping due to excessive temperatures in subsequent thermal treatments and to prevent such a high pressure build-up in the channel plate that the microsheet breaks, the exhaust box is placed in a water-cooled metal capsule during this thermal treatment. Besides the above-mentioned contamination of the getter material, this method has the drawback that the orientation material is not cured or insufficiently cured at the area of the cooled part when using liquid crystal material as an electro-optical material.

More generally, this manufacturing method has the drawback that heating and supplying the getter material with hydrogen results in an unwanted delay in the manufacture of the display device.

OBJECTS AND SUMMARY OF THE INVENTION

It is, inter alia, an object of the present invention to obviate one or more of said drawbacks.

To this end, a display device according to the invention is characterized in that the getter material is accommodated in a capsule of radiation-absorbing material.

The invention is based on the recognition that, due to the use of a capsule to be introduced into the exhaust box at a later stage, the getter material therein can be supplied in advance, whereafter the capsule can be introduced into the vacuum space at a later point of time and opened after completion of the panel. Since the getter material is now not supplied in advance in a holder in the exhaust box, which is subsequently fritted to the channel plate at approximately 450° C. with an organic binder, the contamination mentioned above will be prevented. To be able to open the getter material-filled capsule at a later stage, for example, by means of a laser, this capsule is made of a radiation-absorbing material.

Since the hydrogen gas (or another suitable gas comprising a gas of the group constituted by at least hydrogen, deuterium and hydrogen deuterium) is accommodated in advance in the getter material in a separate capsule which is not subjected to high temperature treatments, the risk of explosion of the capsule is negligible, even with very thin walls of the capsule (2 mm). Breakage of the microsheet is thereby prevented. The getter material is preferably completely enclosed by the wall of the (preferably tubular) capsule. The material used for the capsule may be, for example steel or blue glass which satisfactorily absorbs energy of a laser so that the capsule can be easily opened afterwards. Another suitable material is an alloy with a shape memory. The capsule used should have such a wall thickness that it can withstand the pressure of the hydrogen which is being released during a possible thermal treatment. To this end, the ratio between wall thickness and internal diameter is preferably between 0.3 and 3.

Since the getter material is not contaminated and the capsules can be filled (charged) parallel to the filling of the channel plate, the manufacturing step for filling the display panel with ionizable gas is considerably shorter. Moreover, the cooling treatment may be dispensed with so that the orientation layer of the LC material is cured throughout its surface.

The capsule is preferably arranged in a kind of "reservoir" for example in a chamber of the display device comprising the exhaust connection of the display device, also referred to as "exhaust box"

Instead of making use of the exhaust box for accommodation of the means, the means may be alternatively arranged in one or more compartments.

According to the invention, a method of manufacturing such a display device is characterized in that the method comprises at least the steps of:

i) filling the compartment with an ionizable gas, at least one composite gas of which comprises a gas of the group constituted by hydrogen, deuterium and hydrogen deuterium, ii) supplying a capsule of radiation-transmissive material with a getter material, comprising the gas of the group constituted by hydrogen, deuterium and hydrogen deuterium, iii) introducing the capsule into the compartment and subsequently sealing the compartment, iv) opening the capsule.

These and other aspects of the invention are apparent from and will be elucidated with reference to the embodiments described hereinafter.

BRIEF DESCRIPTION OF THE DRAWINGS

In the drawings:

FIG. 3 is a diagrammatic perspective elevational view, partly broken away, of a part of a construction of a plasma-addressed liquid crystal display device (PALC), while

The Figures are diagrammatic and not to scale. For the sake of clarity, some dimensions are shown in a highly exaggerated form. Similar components in the Figures are denoted as much as possible by the same reference numerals.

DESCRIPTION OF THE PREFERRED EMBODIMENTS

Figure 1:
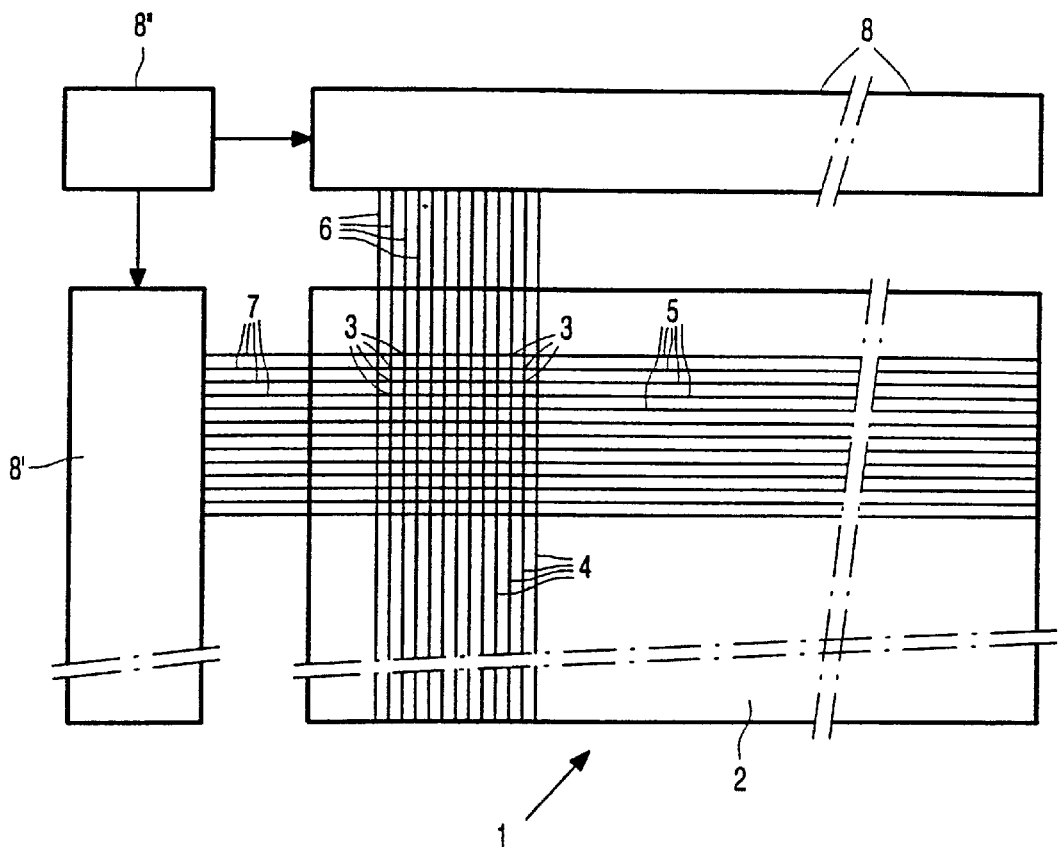
FIG. 1 is a block diagram of a display device.

FIG. 1 is a simplified block diagram of a conventional display device 1 having a surface 2 which is provided with a pattern of pixels which are mutually separated from one another (at a predetermined distance) in the vertical and horizontal directions. Each pixel 3 comprises overlapping parts of (thin, narrow) electrodes 4 from a group of electrodes which are provided in vertical columns, and (thin, narrow) electrodes 5 from a further group of electrodes which are provided in horizontal rows. The electrodes 4 from the group of electrodes are also referred to as column electrodes and the electrodes 5 from the further group of electrodes are also referred to as row electrodes. In a plasma-addressed liquid crystal display device (PALC), the rows are constituted by long, narrow channels (the compartments).

The width of the electrodes 4, 5 determines the dimensions of the pixels 3 which are typically rectangular. The electrodes 4 receive (analog) data drive signals from a drive circuit 8 via conductors 6, and the electrodes 5 receive (analog) data drive signals from a drive circuit 8' via conductors 7.

To realize an image or a data-graphic reproduction on a relevant area of the surface 2 of substrate 1, the display device makes use of a scan control circuit 8" which controls the drive circuits 8, 8'. Various types of electro-optical materials may be used in the display device. Examples of electro-optical materials are (twisted) nematic or ferro-electric liquid crystal materials.

Figure 2:
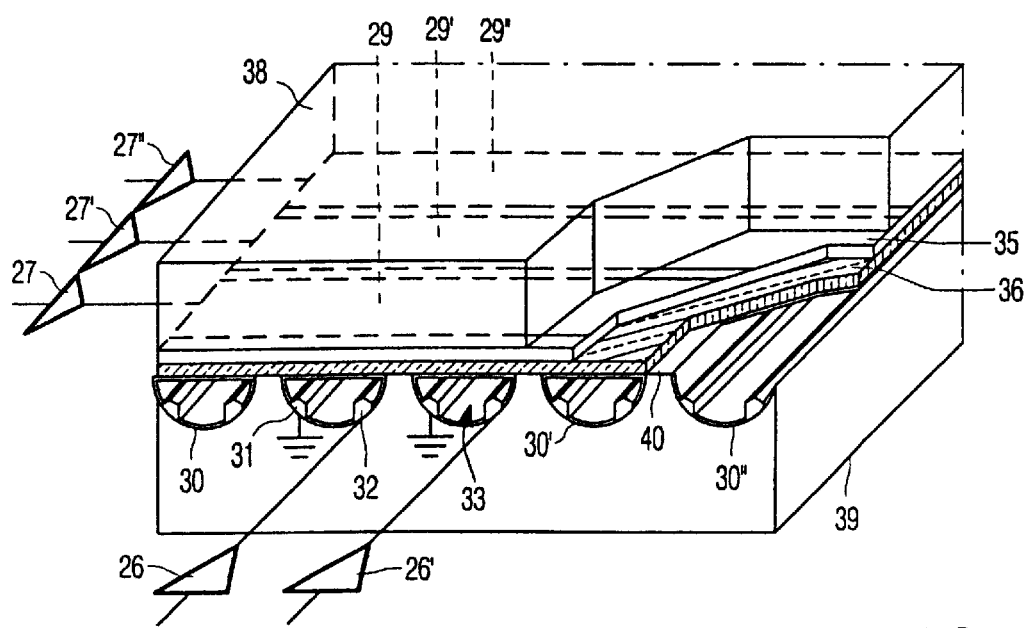
FIG. 2 is a diagrammatic perspective elevational view, partly broken away, of a part of a construction of a plasma-addressed liquid crystal display device (PALC)

FIG. 2 is a diagrammatic perspective elevational view, partly broken away, of a part of a construction of a plasma-addressed liquid crystal display device (PALC) comprising a first substrate 38 and a second substrate 39. FIG. 2 shows only three column electrodes 29, 29', 29". The row electrodes 30, 30', 30", which function as selection means, are constituted by a plurality of parallel, elongated channels (compartments) under a layer 35 of an electro-optical material. The panel is provided with electric connections to the column electrodes 29, 29', 29" and to the plasma electrodes 31, 32, the column electrodes 29, 29', 29" receiving (analog) data drive signals from output amplifiers 27, 27', 27", and the anode electrodes 32 in the (plasma) channels 30, 30', 30" receiving data drive signals from output amplifiers 26, 26'. Each (plasma) channel 30, 30', 30" is filled with an ionizable gas 33 and is closed by means of a thin dielectric layer ("microsheet") 36 which consists of, for example, glass. An inner surface (wall) of each compartment (the channels) is provided with first and second elongated electrodes 31, 32 extending throughout the length of the channel. The second electrode 32 is referred to as anode and is fed with a pulsed voltage, referred to as "strobe pulse", at which electrons emitted from the cathode 31 ionize the gas while forming a plasma. In an alternative embodiment, the cathode is fed with a negative (DC) pulse. Only when the strobe pulse has ended and the gas is deionized is the next channel switched on. To reduce the cycle time, the next channel is usually already ionized before the previous channel has been (completely) deionized.

In such display devices, helium (He) is generally used as a main constituent of the ionizable gas 33. In an alternative embodiment, nitrogen ($N_2$) is used as a basic gas. The ignition voltage of the plasma discharge can be decreased by adding small quantities of a gas (of the order of 0.1 to 3%) to the helium (or nitrogen). A known gas which is added to the basic gas for forming mixtures referred to as Penning mixtures is hydrogen ($H_2$) or another gas of the group comprising $H_2$, $D_2$ and HD, also referred to as guest materials. The properties of the plasma discharge are influenced by using such gas mixtures.

It is known that the addition of small quantities of the above-mentioned gases to helium does not only influence the ignition and sustain voltage of the plasma discharge, but such added gases generally also influence the afterglow decay time τ of the plasma discharge. These gases are generally accommodated in a getter.

Figure 3:
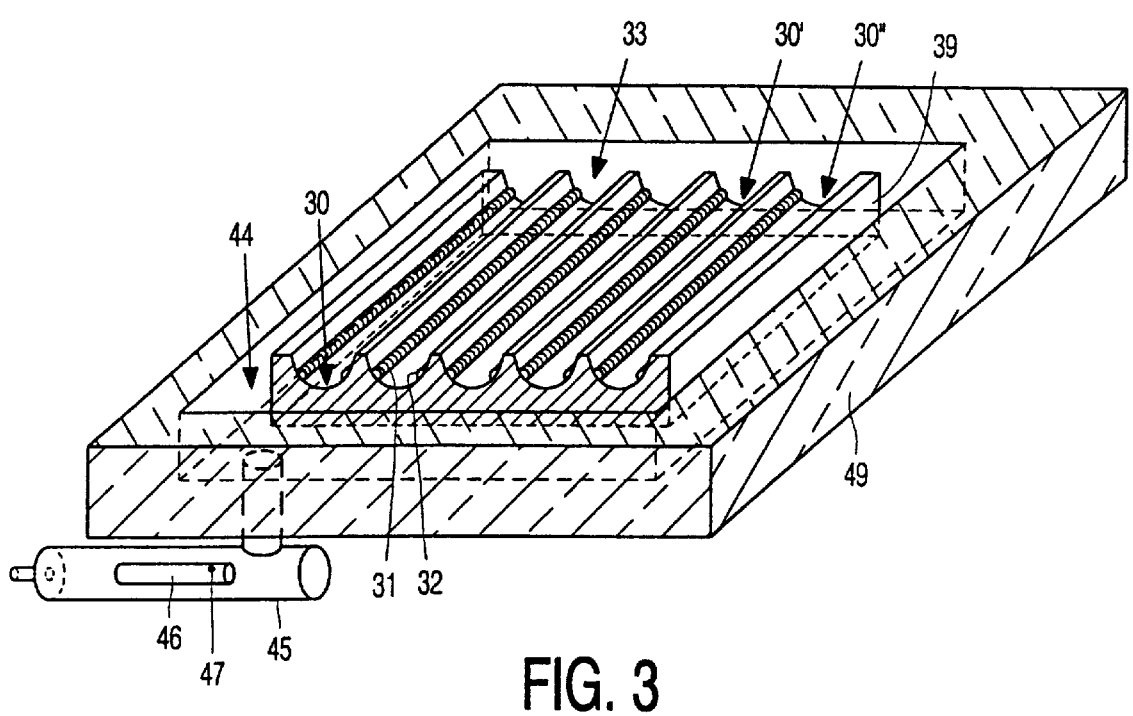
Figure 4:
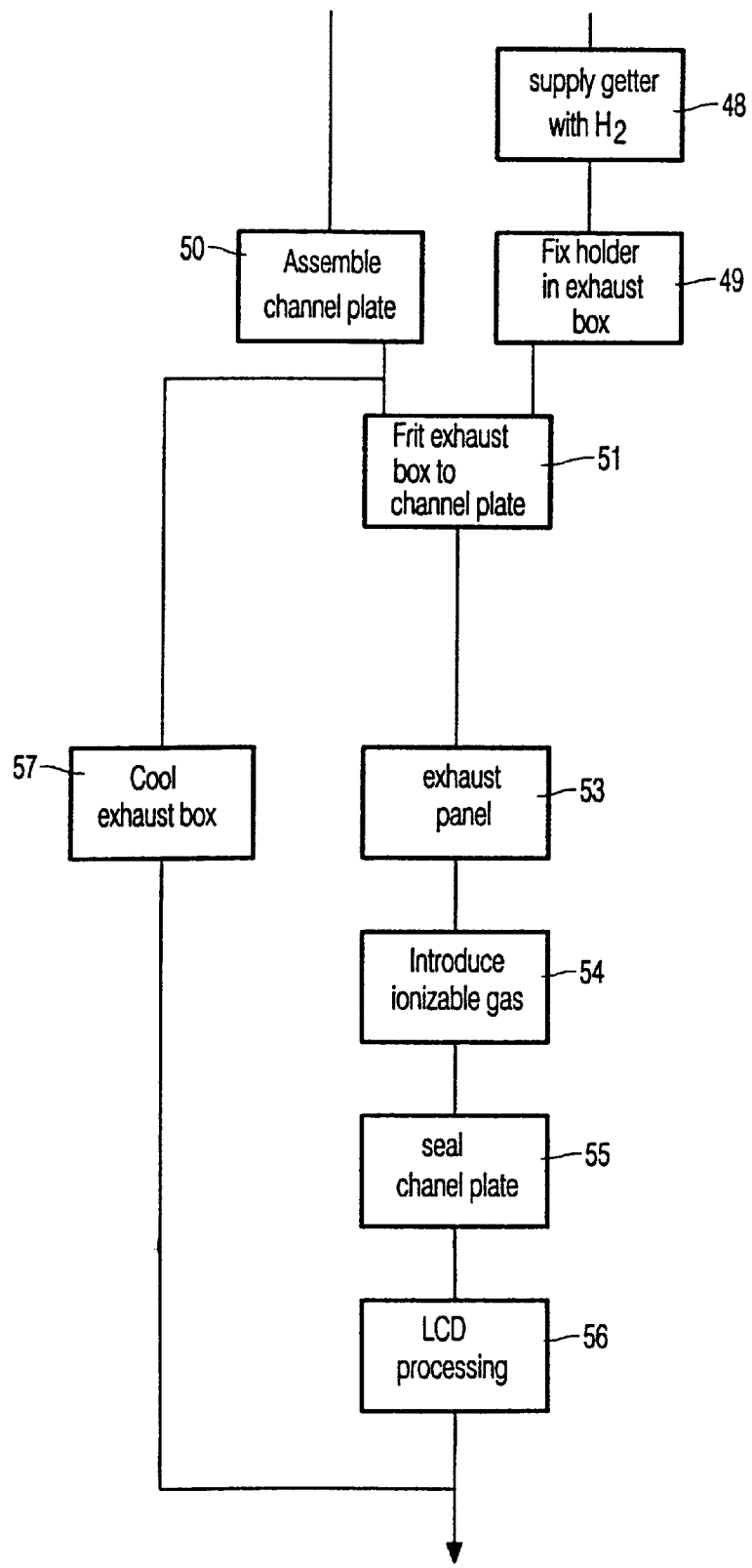
FIG. 4 is a flow chart of a conventional method of manufacturing a part of a construction of a plasma-addressed liquid crystal display device (PALC)

FIG. 3 shows a part of the display device of FIG. 2, showing only the second substrate 39. The second substrate 39 is implemented as a channel plate which comprises a multitude of elongated channels 30, 30', 30" arranged parallel to one another. An inner surface (wall) of each compartment (the channels) is provided with elongated electrodes 31, 32 which extend throughout the length of the channel. In the example of FIG. 3, the channel plate 39 is accommodated in a recess of a further substrate 40. In an alternative embodiment, the channel plate 39 and the further substrate 40 constitute a solid part. The ionizable gas 33 is present in the channels 30, 30', 3" of the channel plate 39. In the example of FIG. 4, a recess or chute 44 realizing a homogeneous distribution of the gas in the display device surrounds the channel plate 39 in the further substrate 40. For filling the display device with the desired ionizable gas (mixture) and for giving the display device the desired (sub)-pressure after the microsheet has been placed on the channel plate 39, the display device is provided with an exhaust box or exhaust tube 45 which, in proportion, is shown extra large.

According to the invention, a capsule 46 of radiation-absorbing material accommodating a getter material, for example, a zirconium vanadium iron alloy (ZrVFe) in which hydrogen is stored is present in the exhaust box in this example. In this example, the capsule is a tube having an internal diameter of approximately 2.5 mm and a wall thickness of approximately 1 to 2 mm, for example 1.5 mm. Although this may be considered to be thin-walled, such a tube can withstand the same pressure (up to approximately 30 bar, the pressure built up by hydrogen which is being released during fritting of the exhaust box to the channel plate) as a vessel having a diameter of 250 mm and a wall thickness of 200 mm. Generally, it holds that, dependent on the material used, the wall thickness and the internal diameter of the capsule should have a mutual ratio of 0.3 to 3 so as to withstand the internal pressure which is built up. The getter material is implemented, for example as a thin rod having a diameter of 2.4 mm and a length of 23 mm, at a tube length of 24 mm. Due to its small dimensions, such a capsule can be easily introduced into the exhaust box after fritting so that the better material is not contaminated. After terminating the thermal processing operation, the thin wall can be easily given an aperture 47 by means of a laser. To this end, the capsule is made of, for example steel or blue glass. When blue glass is used, the wall thickness is approximately 3 mm at an internal diameter of 2.5 mm. Another possibility is he use of alloys having a shape memory. After the getter has been introduced into the tube, it is slightly heated until the tube (or another shape) shrinks, as it were, and tightly fits around the getter material (and possible end plates). Some alloys suitable for this purpose are, for example TiNi, FeNi, AgCd, AuCd, CuZn, CuZnX (X=Si, Sn, Al, Ga), CuAlNi, CuSn, CaAuZn, NiAl and FePd.

FIG. 4 is a flow chart of a part of a conventional method of manufacturing a display device of the PALC type. In this method, the getter, consisting of ZrVFe with Al as a binder, is supplied with hydrogen (step 48) after the channel plate has been manufactured (step 50 in FIG. 4) and secured in an open holder in the exhaust box 45 (step 49). The exhaust box is subsequently fritted to the channel plate at 450° C. (step 51 in FIG. 4). Without special measures, the getter material is then contaminated by the vapor of the organic binder of the frit. This considerably increases the exhaust time during exhaustion of the channel plate (step 53). During exhaustion, the channel plate is heated to about 300° C. so as to dispose of the contaminated getter material. As stated hereinbefore, said contamination occurs when the exhaust box is being fritted to the channel plate.

After heating, the channel plate is filled with the ionizable gas (step 54), whereafter it is sealed. Subsequently, the channel plate is to be subjected to some treatments denoted as LCD processing in FIG. 4 (step 56). These treatments are, inter alia, curing of the orientation layer at about 220° C. and curing the sealing edge between the first substrate and the second substrate (the channel plate) at about 130° C.

Since the getter is present in an open holder, hydrogen is withdrawn from the getter material during the steps 51, 55 and 56. The temperatures used are then so high that the pressure of the hydrogen gas in the channel plate rises to unwanted levels, resulting in breakage of the microsheet.

To prevent this, at least the part of the channel plate where the getter is present (generally, but not always, in or near the exhaust box) must be cooled during these treatments (steps 51 to 56), which is denoted by step 57 in FIG. 4. However, this has the drawback that the orientation layer is not cured at the area of the cooling means.

Figure 5:
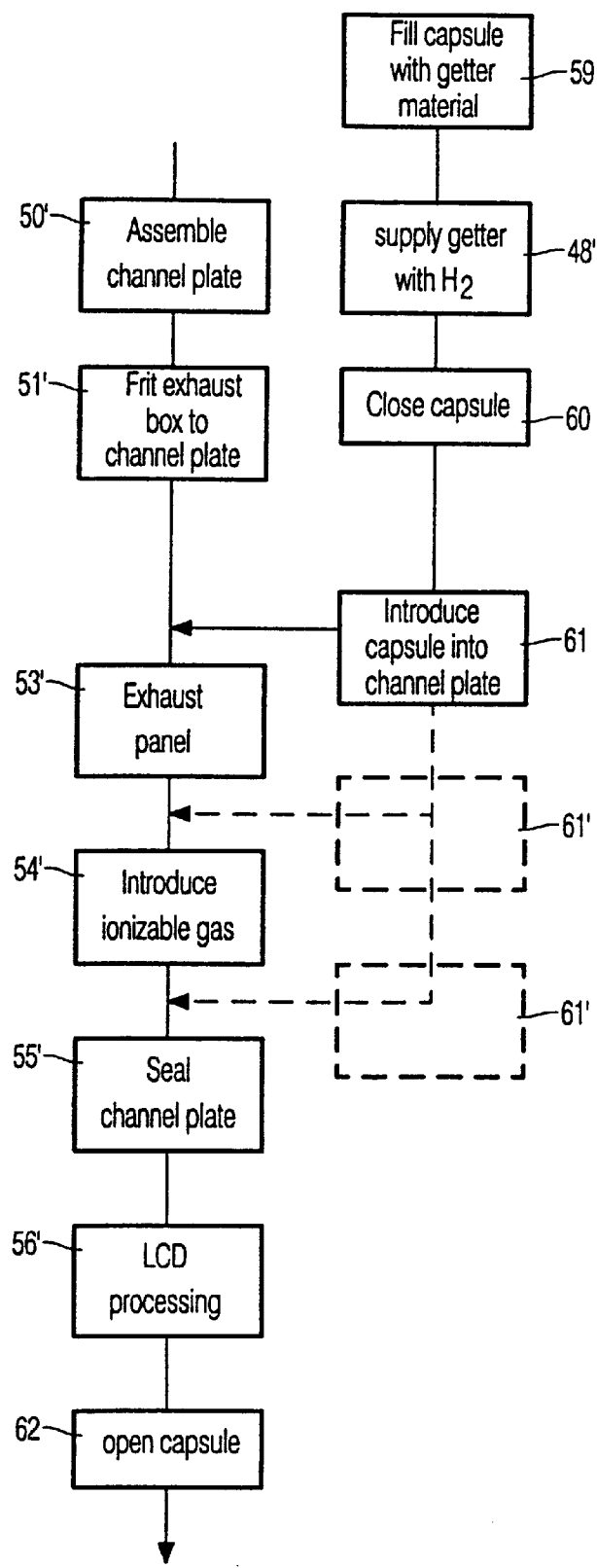
FIG. 5 is a flow chart of a method of manufacturing a part of a construction of a plasma-addressed liquid crystal display device according to the invention.

FIG. 5 shows a flow chart of a part of a method of manufacturing a display device of the PALC type according to the invention. Steps 50', 51', 53', 54', 55' and 56' are analogous to steps 50, 51, 53, 54, 55 and 56 in FIG. 4.

The getter material having the shape of a thin rod with a diameter of 2.4 mm and a length of 23 mm (in this example) is transferred to a tightly fitting capsule (step 59), in this example a tube having a wall thickness of 1.5 mm, an internal diameter of 2.5 mm and a length of 24 mm. The getter material is subsequently supplied with, for example hydrogen (step 48'), whereafter the capsule, of blue glass in this example, is closed (step 60). Since the hydrogen released from the getter material remains within the capsule 45 at higher temperatures, which capsule is opened at a later stage, this capsule can be introduced into the channel plate at various instants during manufacture (step 61). This is preferably done before exhausting so that possible contaminations absorbed on the capsule are removed, but this is still possible at later instants prior to sealing (denoted by 61' in FIG. 5). Experiments have proved that the capsule withstands the further steps without any detrimental consequences. After the LCD processing and possible cooling of the display panel, the capsule is opened by means of a laser beam (step 62).

One of the advantages of the method is the much shorter processing time. Since there is no contamination, notably the exhausting operation is effected much more rapidly. Supplying the getter material (sometimes also during step 54 in FIG. 4) can now be effected in a separate space outside the actual "processing", which also yields a time gain. Moreover, the orientation material is cured evenly.

It will be evident that many variations within the scope of the invention can be conceived by those skilled in the art.

Capsule 46 is preferably accommodated in the exhaust box but may be alternatively present in the recess or chute 44 or elsewhere in the channel plate. Moreover, capsules have been realized which can withstand temperatures of up to more than 300° C. without breaking. Dependent on the temperatures to be used and the maximum temperature which the capsule can withstand, it can thus be introduced into the channel plate at an earlier stage.

The invention generally relates to a display device with a plasma space accommodating a capsule with a getter material for supplying a guest material ($H_2$, HD, $D_2$). The capsule remains closed until after temperature steps which are so critical that the plasma space could explode have been realized.

The invention is based on every new characteristic feature and every combination of characteristic features.

What is claimed is:

1. A display device comprising at least one compartment which contains an ionizable gas mixture, at least one composite gas of which is a gas of the group constituted by at least hydrogen, said compartment being provided with electrodes for selectively ionizing the ionizable gas during operation, and a getter material in connection with the ionizable gas, characterized in that the getter material is accommodated in a capsule of radiation-absorbing material.

2. A display device as claimed in claim 1, characterized in that the getter material is substantially completely enclosed by the wall of the capsule.

3. A display device as claimed in claim 1, characterized in that the getter material is substantially rod-shaped and the wall of the capsule is substantially tubular.

4. A display device as claimed in claim 1, characterized in that the wall thickness and the internal diameter of the capsule have a mutual ratio of between 0.3 and 3.

5. A display device as claimed in claim 1, characterized in that the wall of the capsule is made of a metal, an alloy having a shape memory, or blue glass.

6. A display device as claimed in claim 1, characterized in that the capsule is accommodated in an exhaust tube or exhaust box of the compartment.

7. A display device as claimed in claim 1, characterized in that the group constituted by at least hydrogen comprises deuterium and hydrogen-deuterium.

8. A method of manufacturing a display device as claimed in claim 1, characterized in that the method comprises at least the steps of:
   i) filling the compartment with an ionizable gas, at least one composite gas of which comprises a gas of the group constituted by hydrogen, deuterium and hydrogen deuterium,
   ii) supplying a capsule of radiation-transmissive material with a getter material comprising the gas of the group constituted by hydrogen, deuterium and hydrogen deuterium,
   iii) introducing the capsule into the compartment and subsequently sealing the compartment,
   iv) opening the capsule.

9. A method as claimed in claim 8, characterized in that the operations of filling the compartment and supplying the getter material with the gas of the group constituted by hydrogen, deuterium and hydrogen deuterium take place simultaneously.

* * * * *